E. HEBBELN.
AUTOMOBILE SIGNAL.
APPLICATION FILED JULY 29, 1920.
1,367,184.
Patented Feb. 1, 1921.
2 SHEETS—SHEET 1.
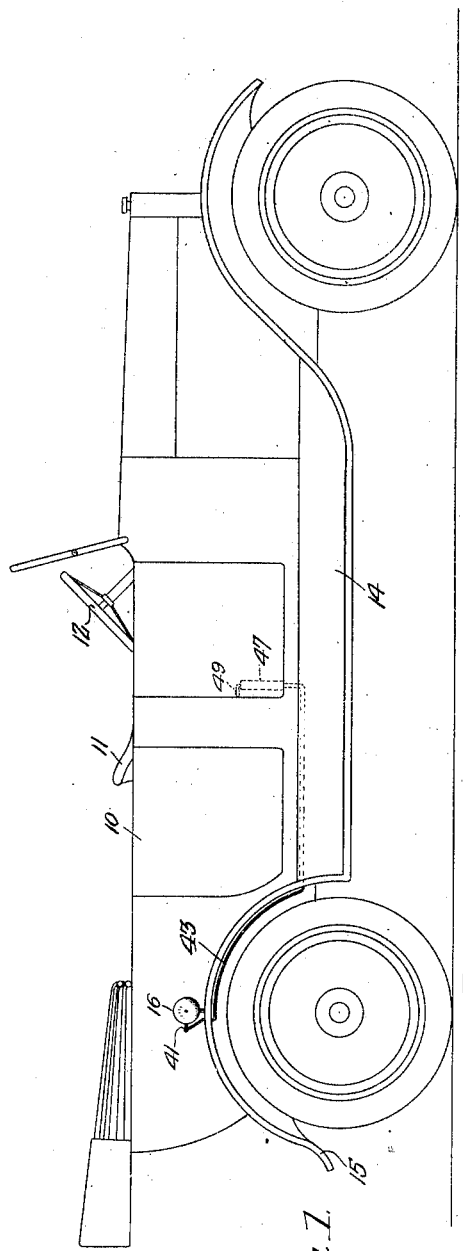
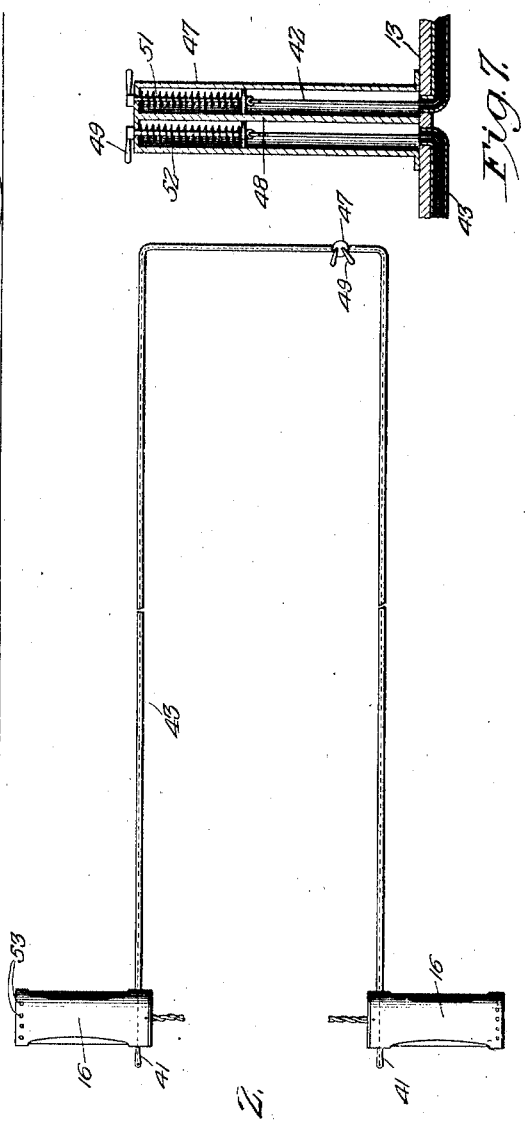
WITNESSES
INVENTOR
Emma Hebbeln,
BY
ATTORNEYS E. HEBBELN.
AUTOMOBILE SIGNAL.
APPLICATION FILED JULY 29, 1920.
1,367,184.
Patented Feb. 1, 1921
2 SHEETS—SHEET 2.
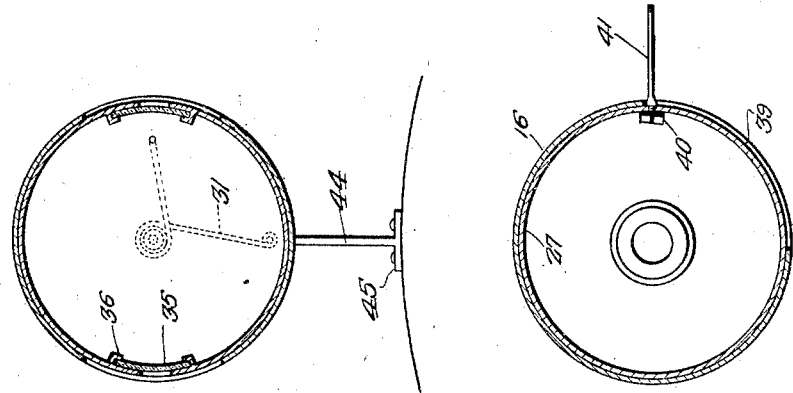
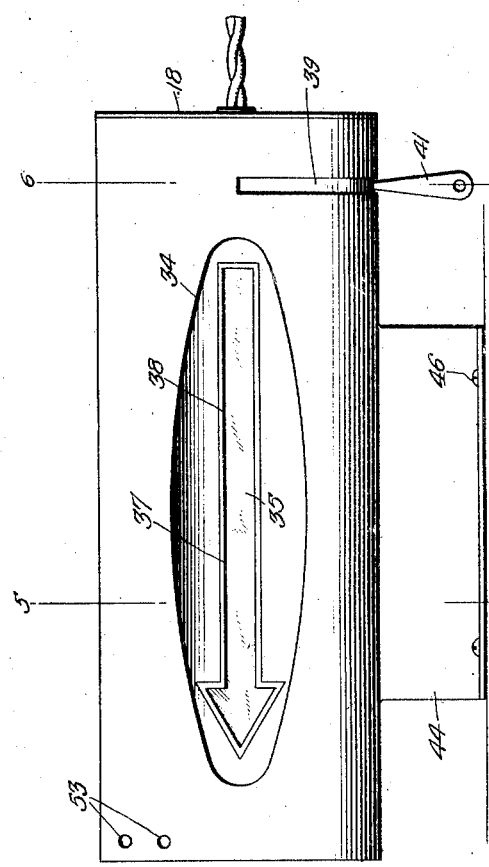
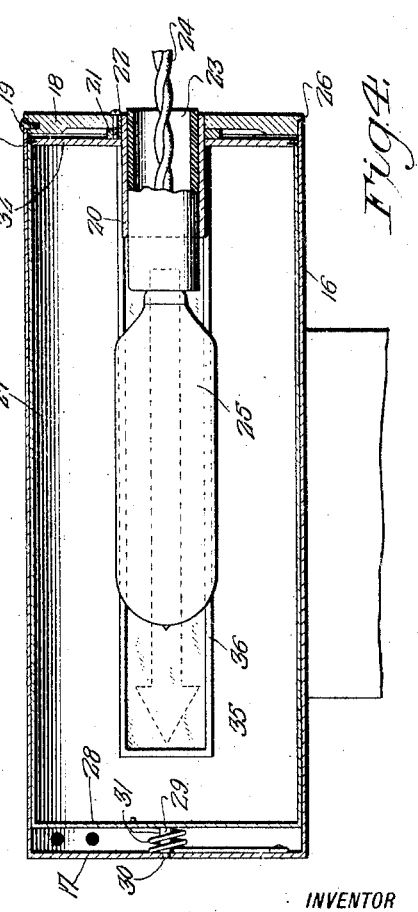
WITNESSES
INVENTOR
Emma Hebbeln,
BY
ATTORNEYS

UNITED STATES PATENT OFFICE.

EMMA HEBBELN, OF LOS ANGELES, CALIFORNIA.

AUTOMOBILE-SIGNAL.

1,367,184.  Specification of Letters Patent.  Patented Feb. 1, 1921.

Application filed July 29, 1920. Serial No. 399,964.

*To all whom it may concern:*

Be it known that I, EMMA HEBBELN, a citizen of the United States, and a resident of Los Angeles, in the county of Los Angeles and State of California, have invented certain new and useful Improvements in Automobile-Signals, of which the following is a specification.

My invention has reference to improvements in automobile signals designed to replace the custom of extending one's arm and hand from the side of a car to indicate when a turn is to be made and to warn pedestrians as well as drivers of cars traveling in either direction of the fact, thus avoiding collisions and accidents.

The invention contemplates an improved automobile side signal to warn drivers of oncoming cars, as well as cars following, of the direction to be taken by the car on which the device is applied, and the invention relates more particularly to an improved signal device which is visible in the daytime as well as at night, and especially adapted for foggy and rainy weather, being discernible at a considerable distance, together with novel means for conveniently actuating the same from the driver's seat.

Other and further objects of my invention will become readily apparent to persons skilled in the art, from a consideration of the following description when taken in conjunction with the accompanying drawings, wherein:—

Figure 1 is a side elevation of an automobile of the touring passenger type having the improved automobile side signal applied thereto, Fig. 2 is a diagrammatic view of the device as installed, Fig. 3 is an enlarged rear elevation of the signal device proper, Fig. 4 is a central longitudinal vertical sectional view thereof, Fig. 5 is a vertical cross section taken on the line 5—5 of Fig. 3, Fig. 6 is a similar view taken on the line 6—6 of Fig. 3, and Fig. 7 is an enlarged vertical sectional view through the operating means for the signals.

Referring to the drawings in detail, in which like reference characters designate corresponding parts throughout the several views, there is shown by way of illustration, an automobile 10 of the touring passenger type having the usual parts including the seat 11 adjacent to the steering wheel 12 and the flooring 13, as well as the running board 14 and back fenders 15 arranged over the rear drive wheels. The signal devices are applied to each of the back fenders or at any other suitable place. They consist of an outer cylindrical casing 16 having an end wall 17 formed integral or permanently secured thereto, while at the opposite end, there is provided a detachable end wall 18 preferably secured in position by radial screws 19 extending through the peripheral wall of the casing and into the edge of the end wall 18, whereby the latter may be removed for obtaining access to the interior parts, as well as for assembling the device. The end wall 18 is therefore stationary and carries in fixed relation thereto, a detachable sleeve or tube 20 which extends axially of the casing and is provided with a securing ring or flange 21 in contact with the end wall 18, screws or the like 22 extending through said end wall parallel to the axis and engaging the ring or flange 21 so that the parts are held in assembled relation.

The tube 20 extends only a short distance into the casing and is adapted to receive a tubular member 23 of fiber, hard rubber, or other dielectric or non-conducting material, said tube snugly fitting in the sleeve 20 and being open at both ends. The inner end of the tube 23 is provided with a lamp socket of the usual or any preferred type, to which the current conducting wires 24 leading from batteries or other suitable source of electrical energy extend, said socket being adapted to receive an electric light bulb or incondescent lamp 25 preferably of elongated form, so as to give the necessary illumination throughout the length of the casing. It should also be noted that the end wall 18 is flanged at its edge portion as shown at 26, so that the portion which is engaged by the screws 19 extends within the casing and is limited in its displacement by the flange, thus insuring accurate fit and preventing the end walls from becoming displaced inwardly.

Rotatably mounted within the housing or casing 16 for oscillatory movement is an inner casing 27, both casings being preferably cylindrical and formed of sheet metal or other opaque material having its end wall 28 spaced from the end wall 17 of the housing and provided with an axially projecting pivot pin 29 provided with a reduced portion 30 rotatably engaged in an aperture in the end wall 17, thus permitting the casing 27 to freely rotate in the housing 16 while at the same time limiting its inward displacement and prevent end thrust in an outward direction. Means are provided between the end walls 17 and 28 to normally rotate the casing 27 in one direction and as shown, said means comprises a helical spring 31 having its ends fixed to the end wall of the casing 27 and the outer casing or housing 16, being also engaged on the pivot 29. The opposite end of the inner casing is provided with a detachable end wall 32 secured by screws or the like 33 in a manner similar to the end wall 18 of the outer casing adjacent thereto. The end wall 32 is apertured centrally to have bearing on the sleeve 20 so that the inner casing may move freely without friction within the outer casing or housing, while end thrust toward the end wall 18 is prevented by contact of the end wall 32 with the hollow or flange 21 which it abuts.

At the front and rear of the housing, which latter is preferably painted a dark color, preferably black, are provided elongated openings 34 preferably of oval outline extending longitudinally of the housing, while diametrically opposite portions of the inner casing are equipped with transparent or translucent panels 35 of red covered glass or celluloid removably mounted in guides 36 arranged at the inside along the opposite longitudinal edges of arrow-shaped openings or the like 37 through the wall of the inner casing and preferably arranged with the heads of the arrows extending outwardly and with the panels 35 arranged beneath or in back of the same. Around the edges of the openings 37 at the other face of the inner casing some bright material forming a rim 38, is provided, preferably by nickel-plating the same or otherwise, so that the signal will be visible in the daytime as well as at nighttime.

Normally, the inner casing is rotated by the spring 31 so that the arrows or direction indicators carried by the inner casing are hinged beneath the walls of the outer casing or housing at the top and bottom, the openings 34 in the housing being covered by the wall portions of the inner casing and in order to limit the oscillatory movement of the inner casing, under the action of the spring, suitable means are provided, the outer casing being preferably produced with a circumferential slot 39 near its inner end and extending for an arc of about 90° from the back of the casing to the bottom portion to expose the inner casing which is provided with a threaded aperture and nut 40 for receiving the threaded end of an arm 41 which projects radially and is adapted for connection with suitable operating means adjacent to the driver's seat. For this purpose, the casings are preferably mounted at either or both sides of the car, preferably the latter, and upon each of the back fenders, as clearly shown in Fig. 1 of the drawings and the flexible connections consisting of chains or cables, as indicated at 42 are extended from the arms 41 in a downward direction through suitable conduits or tubes 43, the housings being provided with upright attaching brackets 44 whereby they may be secured upon the mud guards to extend transversely. These brackets may be formed with the outer housing or casing and are provided with oppositely extended packing gears 45 stamped from a single section of metal to receive the securing means 46 or the device may be permanently secured in position.

The conduits 43 are preferably in the form of flexible metal tubing which run under the back fenders or mud guards and the running boards, as clearly shown in Fig. 1, and then extend upwardly through the floor of the car adjacent to the driver's seat. They are then extended through an upright casing or pipe 47 having separate channels or chambers formed by a division wall 48 dividing the same longitudinally, handles 49 being connected to the ends of the cables with interposed springs, in order that the signals may be actuated. In the form illustrated in Fig. 7, the cables are connected to guides or plungers 50 and the handles are provided with plungers or rods 51 extending through apertures in the top portion of the pipe axially of the chambers thereof, with interposed expansible helical springs 52 arranged between said top walls and the plungers and normally distended, so as to force the plungers downwardly and lower the handles to engagement with the top of the pipe. In addition, the housings or casings of the signals are provided with airholes or openings 53, in order to ventilate the same and prevent the formation of frost on the panels which would interfere with their use in cold weather. As previously stated, when the device is in use, the springs tend to normally cover the signal arrows or direction indicators and this action is assisted by the springs 52 tending to force the cables through the guides or tubes thereof formed by the flexible pipes, in the manner of flexible shafts. However, when it is desired to operate either the right or left-hand signal to indicate the direction of turn, the operator grasps one of the handles 49 and pulls upwardly thereon against the action of the corresponding spring 52, so as to exert pull on the cable 42 connected thereto and thus rotate the inner casing by connection with the corresponding arm 41. This arm when pulled downwardly, will move through the slot 35, thus exposing the signal devices or panels formed by the arrows at the front and rear, so as to be readily visible to drivers of cars traveling in the same direction or in the opposite direction and also warning pedestrians so that collisions and accidents may be avoided. The oscillation of the inner casings are limited by the movements of the arms 41 in the slots 39 and winding of the springs 31 and when the handles are released, the springs will act to return the parts to normal positions when the arrows will be covered. By illuminating the interior of the signal devices, the arrows will be readily visible at night and in foggy and rainy weather, especially at night, when the use of the hand will not be effective. Of course the operating handles may be arranged so as to be operated by lifting or pressing the same down so as to pull on the connections or chains for oscillating the signals by turning the inner casing or cylinder, while the outer cylinder or casing forming the housing of the device remains stationary. The device is especially useful on automobiles and particularly taxicabs, limousines and all closed cars, where the arm signal cannot be used and for vans and large trucks where the arm is hardly noticed.

In view of the foregoing, it is thought that the operation of the device will be readily understood, and in view of the simplicity and practical value that it will commend itself to those skilled in the art.

Having thus described my invention, what I claim is:—

1. An automobile side signal comprising the combination with a pair of opposed signals provided with a housing having a rotatable signal element; of operating means for said signals, comprising arms projected from the rotatable elements, flexible connections leading from said arms, housings for said flexible connections, and means disposed adjacent to the driver's seat of the car for independently actuating said connections, said means comprising a double chambered upright casing through which said connections are extended, and levers forming handles connected to the flexible connections with interposed springs adapted to return the same to normal positions.

2. A side signal for automobiles to indicate direction of turn, comprising illuminated signal elements rotatably mounted, flexible conduits leading from said signals to a point through the floor of the automobile adjacent to the driver's seat, flexible operating members connected to the elements and extending through said tubes, a vertical pipe arranged on the floor adjacent to the operator's seat provided with a partition dividing the same into chambers receiving said operating members therein, plungers in said chambers to which said members are connected and having rods extending through the top portion of the chambers, handles on the upper ends of the plungers for raising the same to rotate the signals, means at the signals for moving the same in the opposite direction, and springs interposed between the top portions of the chambers and the plungers for returning the handles to normal position and assisting said last named means.

3. A signal for indicating direction of turn on automobiles or the like, comprising a cylindrical housing, said housing having an opening therethrough, means for supporting the housing, a casing rotatably mounted within the housing and provided with a transparent colored panel adapted to move in juxtaposition to the opening, means normally tending to move said panel out of alinement with respect to said opening, means for illuminating the interior of the casing, said housing having openings therethrough and provided with a slot extending circumferentially, an arm engaged through said slot and extending radially, said arm having detachable connection with the casing, and a flexible connection having a suitable operating device for exerting pull thereon whereby the casing may be partially rotated to bring the panel in juxtaposition to the opening.

4. An automobile side signal, comprising a cylindrical housing, means in the form of a bracket for supporting said housing in position, said housing having end walls, an inner cylindrical housing rotatable in the other housing first mentioned and having a pivot at one end engaged in one of the end walls thereof for turning movement, a spring connecting the adjacent end walls in spaced relation, to normally turn the inner housing in one position, a sleeve at the opposite end of the other housing on which the inner housing is adapted to turn, illuminating means within the inner housing and having connection with a source of electrical energy extending through said tube, said outer housing having front and rear openings and said inner housing being provided with openings in the form of arrows provided with illuminated rims, colored panels inside of said openings, and means for imparting movement to said inner housing.

5. A signal device for automobiles, comprising a housing of cylindrical form having an apertured end wall and a removable apertured end wall, a casing within the housing having a pivot engaged through the first named aperture to turn, a spring in the space between the end wall of the housing and casing tending to hold the casing in one position, the removable end wall of the housing carrying a sleeve extending inwardly and forming a bearing for the adjacent end wall of the casing, an insulated tube in said sleeve and having a socket for an incandescent bulb at its inner end, and a connection for a suitable source of energy, said casing having arrow-shaped openings and guides along said openings, transparent red colored panels in said guides, the edges of the arrows at the outside being provided with a polished rim visible in the daytime, and means for oscillating said casing to bring the arrows in front of the openings whereby the same are rendered visible in conjunction with said illuminating means.

6. A signal device for automobiles, comprising a housing of cylindrical form having an apertured end wall and a removable apertured end wall, a casing within the housing having a pivot engaged through the first named aperture to turn, a spring in the space between the end wall of the housing and casing tending to hold the casing in one position, the removable end wall of the housing carrying a sleeve extending inwardly and forming a bearing for the adjacent end wall of the casing, an insulated tube in said sleeve and having a socket for an incandescent bulb at its inner end, a connection for a suitable source of energy, said casing having arrow-shaped openings and guides along said openings, transparent red colored panels in said guides, the edges of the arrows at the outside being provided with a polished rim visible in the daytime, an electric light bulb in said socket and extending longitudinally of the casing, said housing having airholes therein, and a circumferential slot near one end adapted to expose the casing, an arm detachably connected to the casing and extended through the slot, and operating means connected to said arm, said arrows being normally hidden from view in the top and bottom portions of the housing and moved to positions in front of said openings against the action of said springs by pull on said connections.

EMMA HEBBELN.